UNITED STATES PATENT OFFICE.

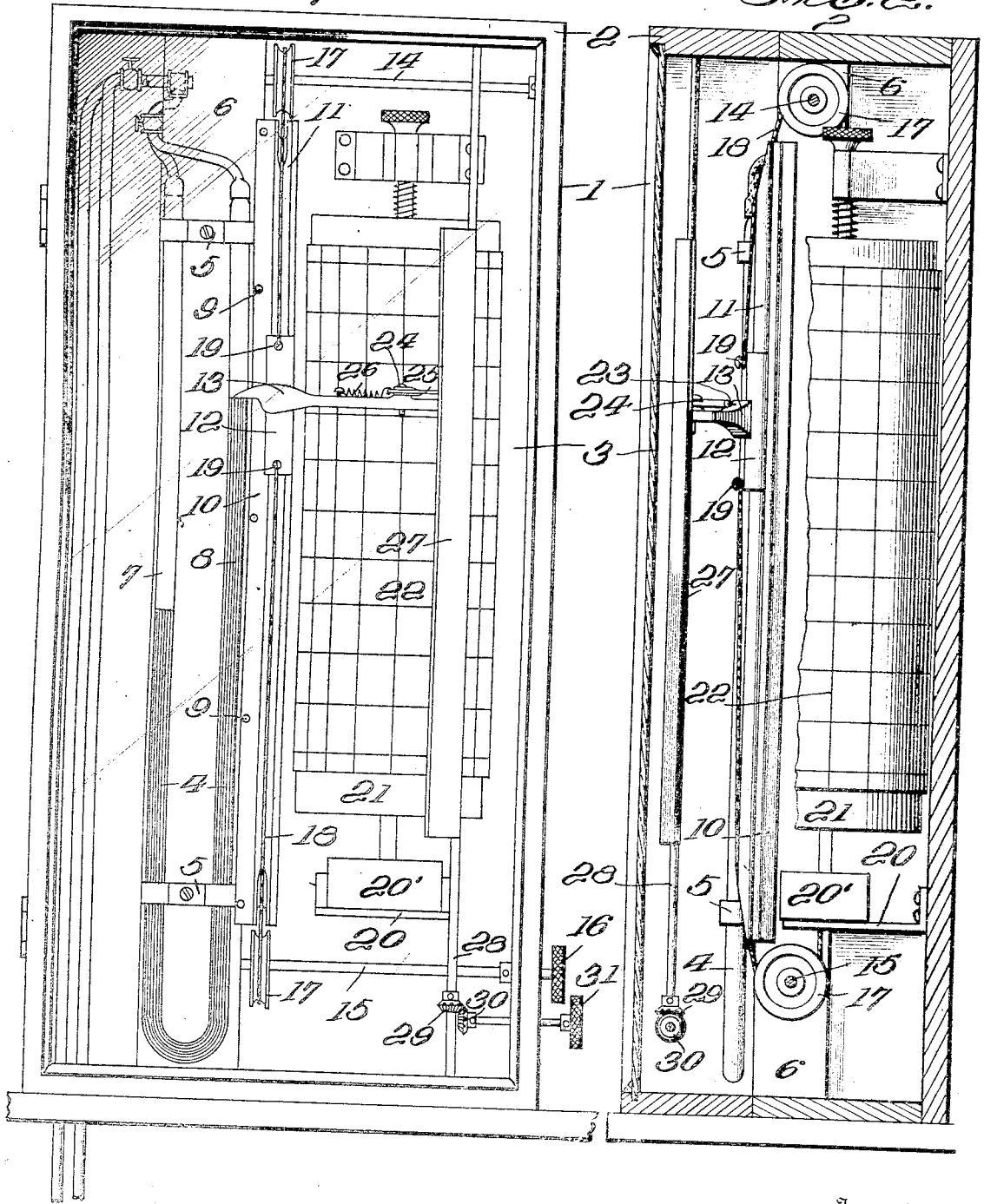

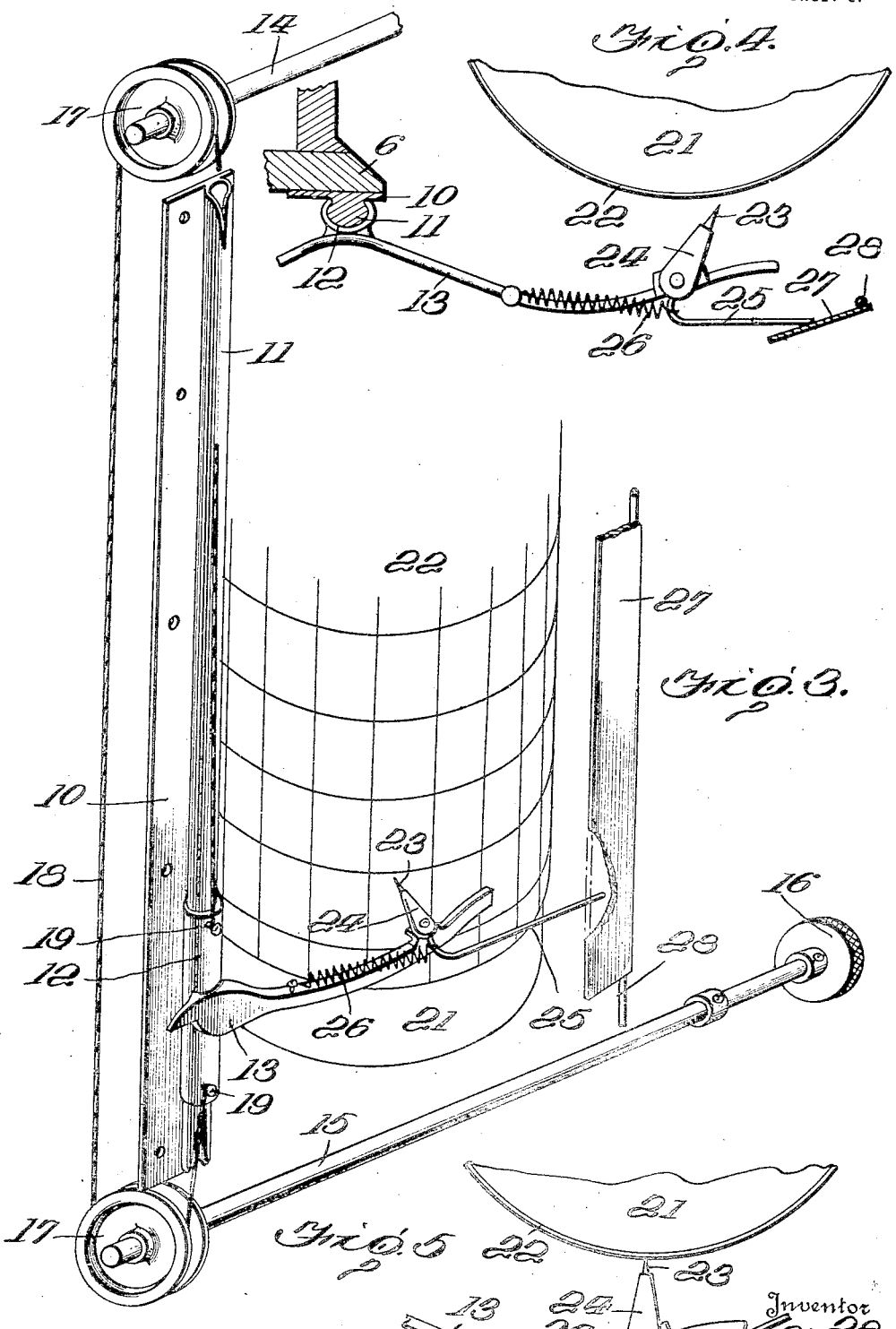

JOHN A. COLE, OF CHICAGO, ILLINOIS.

RECORDING APPARATUS.

1,286,234.

Specification of Letters Patent.  Patented Dec. 3, 1918.

Application filed May 16, 1917. Serial No. 169,097.

*To all whom it may concern:*

Be it known that I, JOHN A. COLE, a citizen of the United States, residing at Chicago, in the county of Cook and State of Illinois, have invented certain new and useful Improvements in Recording Apparatus; and I do hereby declare the following to be a full, clear, and exact description of the invention, such as will enable others skilled in the art to which it appertains to make and use the same.

My invention relates to improvements in recording mechanism and is designed particularly for use in connection with devices for measuring the speed or velocity of flowing streams. A recording device of this character is usually employed in connection with a pitometer, which comprises a pair of tubes or pipes having bent ends, one of which faces up-stream and the other down-stream in the pipe or conduit, so that the flowing stream will exert pressure in the pipe pointing up-stream and will have a drawing action on the pipe facing down-stream. The upper ends of the tubes are connected by suitable pipes with a U-tube containing a suitable indicating liquid, such as tetrachlorid, so that the fluctuations in the velocity of the flowing stream in the conduit, will be communicated to the indicating fluid and will cause it to rise or fall as the case may be.

Numerous mechanisms have been provided for recording the movements of the liquid in the U-tube, some of which were automatic in their action, and it is the object of my invention to provide mechanism which will be partly automatic and partly manual in its operation, whereby the position of the liquid in the U-tube may be ascertained at a glance and recorded manually if desired on a suitable record sheet, which preferably moves automatically.

With the foregoing object outlined and with other objects in view, as will be apparent as the nature of the invention is better understood, my improvement consists in the novel features hereinafter described, reference being had to the accompanying drawings, in which I have illustrated the preferred embodiment of my invention, and more particularly pointed out the same in the appended claims.

Referring to the drawings;

Figure 1 is a front view of my improved recording apparatus.

Fig. 2 is a vertical longitudinal sectional view of the casing which houses the recording mechanism and a side view partly broken away, of the recorder.

Fig. 3 is a detail perspective view showing the means for adjusting the impresison making device relative to the U-tube and a portion of the mechanism for making an impression on the record sheet.

Fig. 4 is a detail showing the impression making mechanism in inoperative position.

Fig. 5 is a similar view showing the impression making mechanism in operative position.

In the drawings 1, is a casing having a hinged door 2 provided with a glass panel 3 whereby the mechanism inclosed in the casing may be inspected and operated without opening the casing. An ordinary U-tube 4 containing suitable indicating fluid, such as tetrachlorid, is secured in the casing by brackets 5, which are connected by suitable fastening means to a vertical support 6 that extends lengthwise of the interior of the casing. The U-tube includes a left leg 7 which is connected by suitable pipes to the bent tube (not shown) that faces up-stream in the liquid conduit and a right leg 8 connected to the bent tube (not shown) which faces down-stream, so that when the water in a water main (not shown) is flowing, there will be an impact upon the bent tube facing the current which is associated with the leg 7 and suction upon the bent tube opening down-stream, that is connected up with the leg 8, whereby the tetrachlorid in the left leg 7 of the U-tube will be lowered and that in the right leg 8 will be raised, as shown in Fig. 1.

Secured to one edge of the support 6 by fastenings 9, is a bracket 10 carrying a guide 11 upon which is slidably mounted a carriage 12, supporting a pointer 13, which is designed to be manually moved along the guide to correspond with the height of the indicating liquid in the leg 8 of the U-tube, whenever desired. It being understood that the pointer 13 is rigidly mounted on the carriage 12, it will be apparent that by moving the carriage the pointer will also move. Extending laterally in the casing 1 are shafts 14 and 15 which have their right hand ends bearing in the support 6 and their opposite ends bearing in the left wall of the casing, the shaft 15 extending through the wall of the casing and being provided with an operating knob 16. Each of the shafts 14 and 15 carries a rigidly mounted pulley 17 and passing over said pulleys, is a cord or belt 18 having its ends connected to the carriage 12 by means of screws or the like 19. It will, therefore, be seen that by turning the knob 16 the pointer 13 may be moved along the guide 11 to register with the height of the indicating liquid in the leg 8 of the U-tube.

Mounted in the casing to the left of the U-tube is a shelf 20, which supports a clock work mechanism 20' that in turn supports and operates a drum 21, which carries a record sheet 22 ruled to indicate the amount of water passing through the water conduit, so that when the pointer is adjusted to register with the indicating liquid in the leg 8 of the U-tube, the number of gallons of water passing through the conduit during a certain length of time will be indicated at the point where the marking pen 23 of the pointer registers with the record sheet.

The record sheet 22 may be ruled to provide a permanent record for one day or for a week and the clock work mechanism may be regulated to turn the drum 21 one entire revolution in a day, whereby the record sheet may be marked at the desired point and a permanent record kept of the amount of water passing through the conduit at different hours during the day.

The marking pen 23 is carried by an arm 24 which is pivotally mounted on the left hand end of the pointer and is provided with a tail 25 that is engaged by a member hereinafter described, for swinging the marker arm 24 to make the impression upon the record sheet. A spring 26 has one of its ends secured to the tail 25 and its opposite end secured to the pointer for maintaining the pen 23 out of contact with the record sheet and retracting the pen after an impression is made.

The means for operating the tail of the marker arm 24 consists of a flap 27 rigid with a vertical shaft 28, which is provided with a bevel gear 29, operated by a similar gear 30 from a milled handle 31, so that by turning the handle 31 the flap 27 will swing the tail of the marker arm 24 and cause the pen 23 to make an impression upon the record sheet.

With the foregoing mechanism, the operator can see at a glance the position of the indicating liquid in the U-tube and can then turn the knob 16 to bring the pointer 13 in register with the height of the indicating liquid in the right leg 8 of the U-tube. By then viewing the position of the marking pen relative to the record sheet, the amount of water passing in the conduit may be ascertained. If it is desired to make a record of this amount, it is only necessary to turn the handle 31 and make the impression and as the record sheet travels a new or unmarked surface will be brought to recording position and a permanent record may be kept.

What I claim and desire to secure by Letters Patent is:—

1. A recording device comprising a casing, an indicator mounted in said casing, a shaft mounted in said casing and provided with a pulley, another shaft also mounted in said casing carrying a pulley and provided with an operating knob, a guide located adjacent said indicator, a carriage mounted on said guide and carrying a pointer adapted to be brought into register with said indicator, a cord passing over said pulleys and having its ends connected to the carriage, a record sheet, a marking device carried by said pointer and movable toward and away from said record sheet for noting the position of the pointer on the record sheet, and means for operating said marking device.

2. A recording device comprising a casing, a U-tube mounted therein and containing indicating liquid, a guide mounted in the casing and extending parallel with the legs of said tube, a pointer slidably mounted on said guide, manually operated means for shifting said pointer along the guide for bringing the same into register with the upper surface of the indicating liquid in one leg of the tube, a marking device carried by said pointer and movable toward and away from said record sheet, and means for moving said marking device into contact with the record sheet, whereby a mark is made upon the record sheet.

3. In a recording device, an indicator, a pointer adapted to be brought into register with said indicator, a record sheet, a marker arm pivotally mounted on said pointer and carrying a marking point, a tail carried by said arm, and means engaging said tail for swinging said arm to bring the marking point into contact with the record sheet.

4. In a recording device, a pointer, an arm pivotally mounted on said pointer and carrying a marking point, a tail rigid with said arm, a spring connecting said tail and said pointer for swinging the arm in one direction, a record sheet and means engaging said tail for swinging said arm in the opposite direction to cause the marking point to make an impression on the record sheet.

5. A recording device comprising a casing, an indicator mounted in said casing, a pointer adapted to be brought into register with said indicator, a record sheet, an arm pivotally mounted on said pointer and carrying a marking point adapted to make an impression on said sheet, a tail integral with said arm, a spring connecting said tail to said pointer for moving the arm in one direction, a shaft mounted in said casing and carrying a flap engaged by said tail, and means for turning said shaft, whereby said flap will swing the tail and cause the marking point to make an impression on said record sheet.

6. A recording device comprising a casing, a U-tube mounted therein and containing indicating liquid, a guide mounted in the casing and extending parallel with the legs of said tube, a carriage slidably mounted on said guide and carrying a pointer, a plurality of horizontal shafts carrying fixed pulleys mounted in said casing, a cord passing over said pulleys and having its ends connected to said carriage, manually operated means for turning one of said shafts to move the carriage on its guide, a rotatable drum mounted in said casing and provided with a record sheet, an arm pivotally mounted on said pointer and carrying a marking point for making an impression on the record sheet, a spring for moving the arm in one direction, a tail rigid with the arm for moving the arm in the opposite direction, and manually operated means for moving said tail in one direction to make an impression on the sheet.

In testimony whereof I affix my signature.

JOHN A. COLE.